(12) United States Patent
Yajima (10) Patent No.: US 8,355,763 B2
(45) Date of Patent: Jan. 15, 2013

(54) PORTABLE RADIOTELEPHONE

(75) Inventor: Takayuki Yajima, Kanagawa (JP)

(73) Assignee: Kyocera Corporation, Fushimi-ku, Kyoto-shi, Kyoto (JP)

( * ) Notice: Subject to any disclaimer, the term of this patent is extended or adjusted under 35 U.S.C. 154(b) by 1252 days.

(21) Appl. No.: 10/712,511

(22) Filed: Nov. 13, 2003

(65) Prior Publication Data

US 2004/0166907 A1    Aug. 26, 2004

(30) Foreign Application Priority Data

Nov. 14, 2002    (JP) .................................. 2002-330704

(51) Int. Cl.
*H04M 1/00*    (2006.01)

(52) U.S. Cl. ............... 455/575.3; 455/550.1; 455/575.1; 379/428.01; 379/433.01; 379/433.11; 379/433.13

(58) Field of Classification Search ............... 455/550.1, 455/569.1, 575.1, 575.3, 575.4, 90.3; 379/428.01, 379/433.11, 433.12, 433.13, 433.01
See application file for complete search history.

(56) References Cited

U.S. PATENT DOCUMENTS

| | | | |
|---|---|---|---|
| 6,359,984 B1 * | 3/2002 | Kim ........................ | 379/433.02 |
| 6,751,446 B1 * | 6/2004 | Kim et al. ................... | 455/90.1 |
| 6,819,939 B2 * | 11/2004 | Masamura ................. | 455/550.1 |
| 6,993,366 B2 * | 1/2006 | Kim ........................... | 455/569.1 |
| 2002/0042287 A1 * | 4/2002 | Asami .......................... | 455/550 |
| 2002/0198017 A1 * | 12/2002 | Babasaki et al. ............. | 455/550 |
| 2003/0064758 A1 * | 4/2003 | Mizuta et al. ................ | 455/566 |
| 2004/0067770 A1 * | 4/2004 | King et al. .................... | 455/557 |
| 2004/0204194 A1 * | 10/2004 | Akai et al. ................. | 455/575.1 |

FOREIGN PATENT DOCUMENTS

| | | | |
|---|---|---|---|
| JP | 7-288860 | | 10/1995 |
| JP | 10200422 A | * | 7/1998 |
| JP | 11-215218 | | 8/1999 |
| JP | 2000-196720 | | 7/2000 |
| JP | 2000-316040 | | 11/2000 |
| JP | 2000316040 A | * | 11/2000 |

(Continued)

OTHER PUBLICATIONS

An office action received fromthe Korean Patent Office (and Engliush-language translation) for correspoinding patent application.

(Continued)

*Primary Examiner* — Raymond Dean
(74) *Attorney, Agent, or Firm* — John C. Garces; Schulte Roth & Zabel LLP (57) ABSTRACT

An overlapping type portable radiotelephone includes a first housing having at least a display section and speakers, and a second housing having at least a main operation section and a microphone. The first and second housings are coupled each other so as to be opened and closed. The main operation section is covered with the first housing in a closed state and exposed outside in an opened state. A display screen in the display section and the speakers are exposed outside both in the closed state and in the opened state. With this overlapping type portable radiotelephone, conversation can be effected even in the closed state, and there is further provided a communication control section for enabling the conversation to be continued, even though the portable radiotelephone is brought into the opened state from the closed state while the conversation is in progress.

18 Claims, 6 Drawing Sheets

| FOREIGN PATENT DOCUMENTS | | |
|---|---|---|
| JP | 2001-308996 | 11/2001 |
| JP | 2001-309000 | 11/2001 |
| JP | 2001-309002 | 11/2001 |
| JP | 2002-135380 | 5/2002 |
| JP | 2002-141984 | 5/2002 |
| JP | 2002-171189 | 6/2002 |
| KR | 100381945 | 4/2003 |

OTHER PUBLICATIONS

Japanese Office Action dated Oct. 24, 2006 with partial English translation.

Japanese Office Action dated Apr. 25, 2007 with partial English translation.

* cited by examiner

PORTABLE RADIOTELEPHONE

BACKGROUND OF THE INVENTION

1. Field of the Invention

The present invention relates to a portable radiotelephone including a plurality of housings which are coupled so as to be overlapped each other.

2. Description of the Related Art

Figure 7:
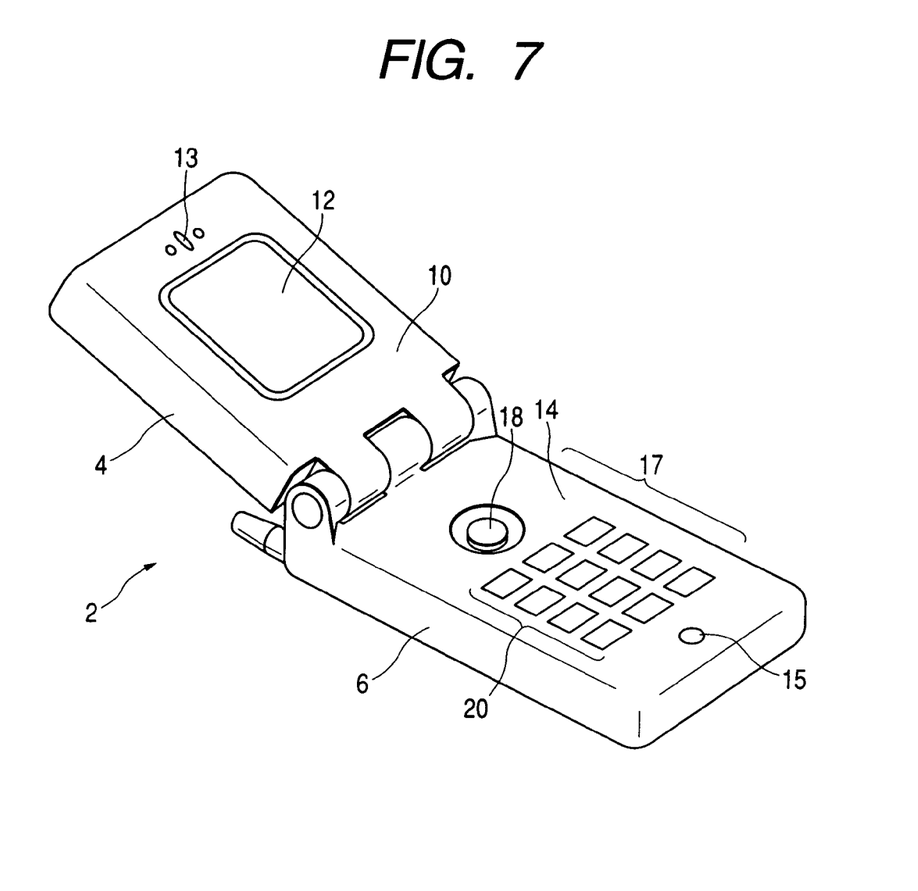
FIG. 7 is a perspective view showing a conventional folding type portable radiotelephone 2.

Conventionally, a folding type portable radiotelephone 2 shown in FIG. 7 is generally known as a folding type portable radiotelephone including two housings which can be folded. In the folding type portable radiotelephone 2, a display screen 12 such as LCD (Liquid Crystal Display) for displaying output information and a speaker 13 are provided on an inner face 10 of one housing 4, and a main operation section 17 and a microphone 15 are provided on an inner face 14 of another housing 6.

The main operation section 17 has a cursor key 18 for indicating upward, downward, right and left directions so that items displayed on the display screen 12 can be selected, and ten keys 20 for inputting numbers, characters, etc., and other keys for various functions.

However, the folding type portable radiotelephone 2 as shown in FIG. 7 has a problem that while the housing 4 and the housing 6 are folded, the display screen 12 cannot be seen unless the housings 4 and 6 are opened, and even though information is displayed on the display screen 12, the information cannot be browsed in a folded state.

In order to solve such a problem that it is troublesome and annoying to open the housings 4 and 6, there have been proposed some mobile phone sets in which the display screen 12 is directed outward even in the folded state or in a state corresponding to the folded state. Examples of the mobile phone sets of this type are the overlapping type mobile phone sets disclosed in JP-A-H11-215218, JP-A-2002-141984 and JP-A-2002-135380.

These overlapping type mobile phone sets are so designed that the display screen provided on one of the housings is directed inward in a state where two housings to be coupled are opened, which is substantially same manner as the folding type portable radiotelephone 2 as shown in FIG. 7. However, different from the above described folding type portable radiotelephone 2, the overlapping type mobile phone sets are so designed that one of the housings can be folded and overlapped on another housing by twisting it by 180 degree at a coupling section between the two housings. Therefore, the display screen can be directed outward, even in a state where the two housings are overlapped.

Disclosed in JP-A-H07-288860 is another type of the conventional overlapping type portable radiotelephone. This overlapping type portable radiotelephone is so designed that one housing having the display screen and another housing having the operation section are coupled in an overlapped state which the display screen and the operation section are directed in the same direction, through a shaft which is provided in a direction of passing through these two housings.

This overlapping type portable radiotelephone can be opened, by rotating one housing with respect to another housing around the shaft by such an action as spreading a fan, and also, the two housings can be kept overlapped each other with the display screen directed outward.

Since the two housings can be kept in the overlapped state with the display screen directed outward in these overlapping type mobile phone sets, the information on the display screen can be browsed while the two housings are kept in the overlapped state. However, in the case of starting a call, the two housings must be opened as well as the conventional folding type portable radiotelephone 2.

On the other hand, with the overlapping type portable radiotelephone disclosed in JP-A-2000-196720, it is possible to browse the information on the display screen while two housings are in the overlapped state, and it is also possible to start a call while the two housings are in the overlapped state.

However, according to the related arts disclosed in the above JP-A-H11-215218, JP-A-2002-141984, JP-A-2002-135380 and JP-A-H07-288860, when a user receives an incoming call, he must open the two housings to start the telephone conversation.

Therefore, it takes labor to start the conversation. Besides, in the case where the user lately becomes aware of the incoming call, he will be unable to put the portable radiotelephone into a state available for conversation before a person on the other end of the phone disconnects the call. This will make the person on the other end disagreeable, and convenience of the portable radiotelephone cannot be fully achieved.

On the other hand, according to the related art disclosed in the above JP-A-2000-196720, the folding type portable radiotelephone can be brought into a state available for conversation at once, because the conversation can be had even in the closed state. However, there is a problem that because a length of the downsized portable radiotelephone is too short in the closed state, when the speaker comes near the user's ear, the microphone does not close to the user's mouth, which will make the user uneasy.

SUMMARY OF THE INVENTION

The object of the present invention is to provide an portable radiotelephone which can be immediately put into a state available for conversation even in a closed state which two housings are overlapped, and with which a user is free from feeling of uneasiness because a microphone is not close to his mouth during the conversation.

The invention provides a portable radiotelephone including: a first housing having at least a display section and a speaker section; a second housing having at least a main operation section and a microphone; wherein both of said housings are openably and closably coupled together so that said main operation section is covered with said first housing in a closed state and is exposed outside in an opened state, and said display section and said speaker section are exposed outside in both of the closed state and the opened state, a communication control section for enabling a communication in the closed state, and enabling the communication to be continued even after both of said housings are brought into the opened state from the closed state while the communication is in progress.

Furthermore, the portable radiotelephone further includes: at least one auxiliary operation section provided on other surface of said first and second housings than surfaces where said first and second housings are opposed each other in the closed state, wherein said communication control section controls to connect a communication line when an incoming call is received and then said auxiliary operation section is operated in the closed state.

Furthermore, said speaker section has a first speaker and a second speaker which are arranged on a surface provided with said display section of said second housing interposing said display section, said first housing and said second housing are coupled each other to be rotated around a shaft which is provided in a direction of passing through the first and second housings, once the communication line is connected in the closed state, said communication control section controls said first speaker which is arranged furthest from said microphone to function as a receiver, but controls said second speaker not to function, and once said portable radiotelephone is brought into the opened state from the closed state while the communication is in progress, and said communication control section controls said second speaker to function as a receiver, but controls said first speaker not to function.

Furthermore, said communication control section controls said portable radiotelephone to disconnect the communication once the portable radiotelephone is brought into the closed state again while the communication is in progress in the opened state.

Furthermore, the portable radiotelephone further includes: an opened/closed state detecting section for detecting the opened/closed state of said first housing and said second housing.

Furthermore, said first and second speakers sound an incoming call sound when an incoming call is received.

Furthermore, each of said first and second speakers independently sounds when an incoming call is received, to make stereo effects.

Furthermore, said first housing and said second housing are coupled each other so as to be opened and closed by sliding motion.

The invention provides a portable radiotelephone including a second housing having a main operation section, a first housing to be overlapped on said second housing so as to cover said main operation section, and a coupling section which couples respective one ends of said first and second housings in such a manner that said first and second housings are relatively rotated around a shaft extending in a direction of overlapping, in which said portable radiotelephone is designed so as to be shifted between a closed state which said first and second housings are overlapped and an opened state which said first or second housing is rotated by 180 degree from this closed state, a microphone is provided on the other end of said second housing, a first speaker is provided at one end of said first housing which is directed in same direction with a face thereof provided with said main operation section, and a second speaker is provided at the other end of said first housing which is directed in same direction with a face thereof provided with said main operation section, and a communication control section controls communication to perform in either said closed state and said opened state, and controls communication to be continued even after the portable radiotelephone is brought into the opened state from the closed state while the communication is in progress.

Furthermore, the communication is performed by means of said first speaker and said microphone in the closed state, and the communication is performed by means of said second speaker and said microphone in the opened state.

Furthermore, said first and second speakers sound an incoming call sound when an incoming call is received.

Furthermore, each of said first and second speakers independently sounds when an incoming call received, to make stereo effects.

Furthermore, the portable radiotelephone further includes: a communication control section for controlling functions of said first and second speakers and said microphone; and at least one auxiliary operation section provided on other face of said first and second housings than surfaces where said first and second housings are opposed each other in the closed state wherein said communication control section controls to connect a communication line when an incoming call is received and then said auxiliary operation section is operated in the closed state.

Furthermore, said communication control section controls said portable radiotelephone to disconnect the communication once the portable radiotelephone is brought into the closed state again while the communication is in progress in the opened state.

Furthermore, the portable radiotelephone further includes a gain adjusting section for adjusting sensitivity of said microphone, wherein said communication control section controls said gain adjusting section to increase gain of said microphone during the communication in the closed state to be higher than gain of said microphone during the communication in the opened state.

According to the portable radiotelephone of the invention, the communication can be made even in the closed state which the two housings are overlapped, and therefore, when an incoming call is received, the user can start the communication at once by operating the auxiliary operation section without opening the two overlapped housings, unlike the conventional portable radiotelephone. For this reason, even though the user lately become aware of the incoming call, he can receive the incoming call before the person on the other end disconnects the call.

Moreover, in the case where the user feels uneasy because the microphone is not close to his mouth during the communication in the closed state, it is possible to elongate the portable radiotelephone by bringing it from the closed state into the opened state after he stated a call or received an incoming call in the closed state. Therefore, while the conversation can be continued, even after the microphone is close to his mouth. As a result, it is possible to continue the communication without uneasy feeling as well as with the conventional portable radiotelephone Moreover, in the case where the portable radiotelephone is carried after the communication is finished, an action of bringing the portable radiotelephone from the opened state into the closed state which achieves good portability with disconnection at the same time. Therefore, operability of the portable radiotelephone can be enhanced.

DETAILED DESCRIPTION OF THE PREFERRED EMBODIMENTS

An embodiment of the portable radiotelephone according to the invention will be specifically described referring to the drawings.

FIGS. 1 to 6 are drawings to be referred for explaining an overlapping type portable radiotelephone 30 according to one embodiment of the invention. An overlapping type portable radiotelephone 30 as shown in these drawings will be described with the same reference numerals for the substantially same sections in the conventional folding type portable radiotelephone 2, and duplicate description of the substantially same structure will be omitted.

Figure 1:
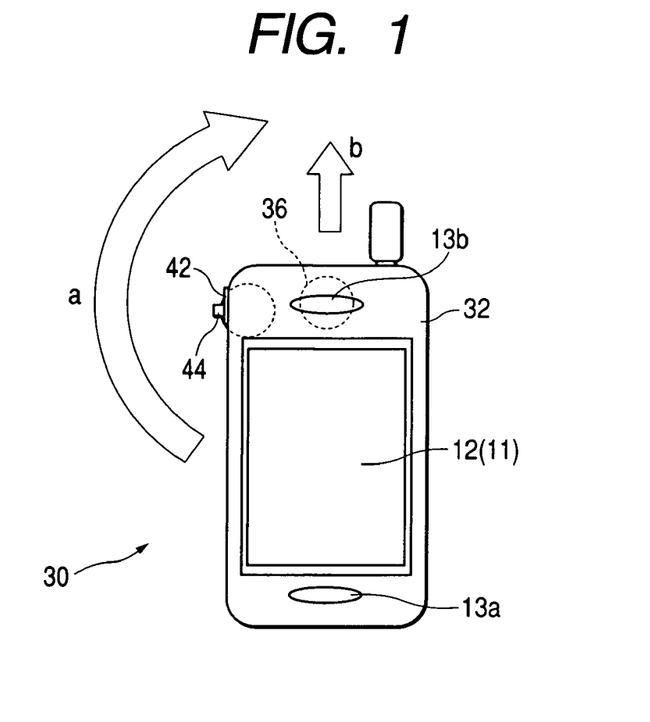
FIG. 1 is a front view showing an overlapping type portable radiotelephone 30 in a opened state according to an embodiment of the invention.
Figure 2:
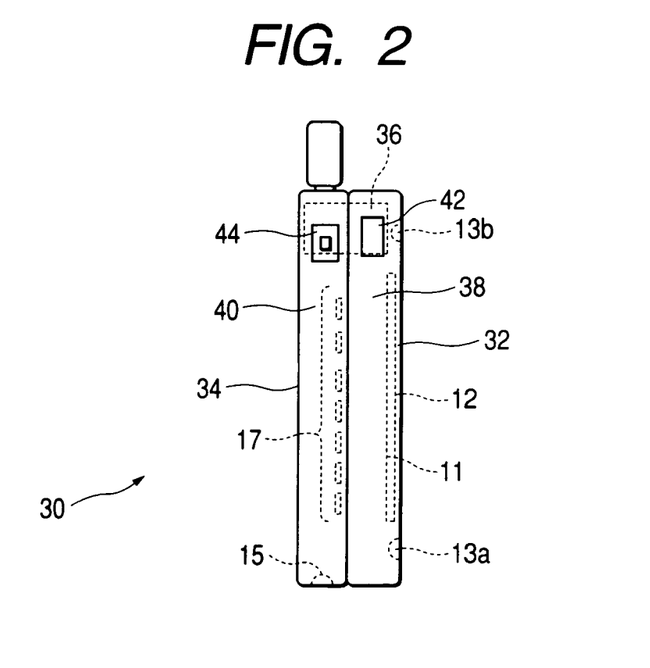
FIG. 2 is a left side view of the overlapping type portable radiotelephone 30 in a opened state in FIG. 1.

As shown in FIGS. 1 and 2, this overlapping type portable radiotelephone 30 includes a first housing 32 and a second housing 34 which are rotatably coupled around a shaft 36 provided in a direction of passing through the first housing 32 and the second housing 34 which are overlapped.

In the overlapping type portable radiotelephone 30, a display section 11 is provided on a surface, which is in an opposite side to the second housing 34, of the first housing 32, so that a display screen 12 can be seen from outside even in a state that the first housing 32 and the second housing 34 are overlapped. Moreover, a side key 42 and a three way lever key 44 as an auxiliary operation section are provided on each side faces 38 and 40 of the first housing 32 and the second housing 34, so that the portable radiotelephone 30 can be operated in the state that the first housing 32 and the second housing 34 are overlapped.

Further, speakers 13a and 13b are provided on the surface, where the display section 11 is provided, of the first housing 32, so that sounds uttered from the speakers 13a and 13b can be heard even in the state that the first housing 32 and the second housing 34 are overlapped. The speakers 13a and 13b are arranged in such a manner that a distance of the speaker 13a from the shaft 36 is greater than a distance of the speaker 13b from the shaft 36. In the overlapping type portable radiotelephone 30 of the embodiment, the speaker 13a and the speaker 13b are arranged in respective positions at both ends of the first housing 32 interposing the display section 11.

The microphone 15 is provided at an end of the second housing 34 which is in an opposite side to the shaft 36. In the embodiment, the microphone 15 is provided at an end face of the second housing 34 which is opposite to the shaft 36, so that the microphone 15 is not covered with the first housing 32 even in the case where the first housing 32 and the second housing 34 are overlapped.

Figure 3:
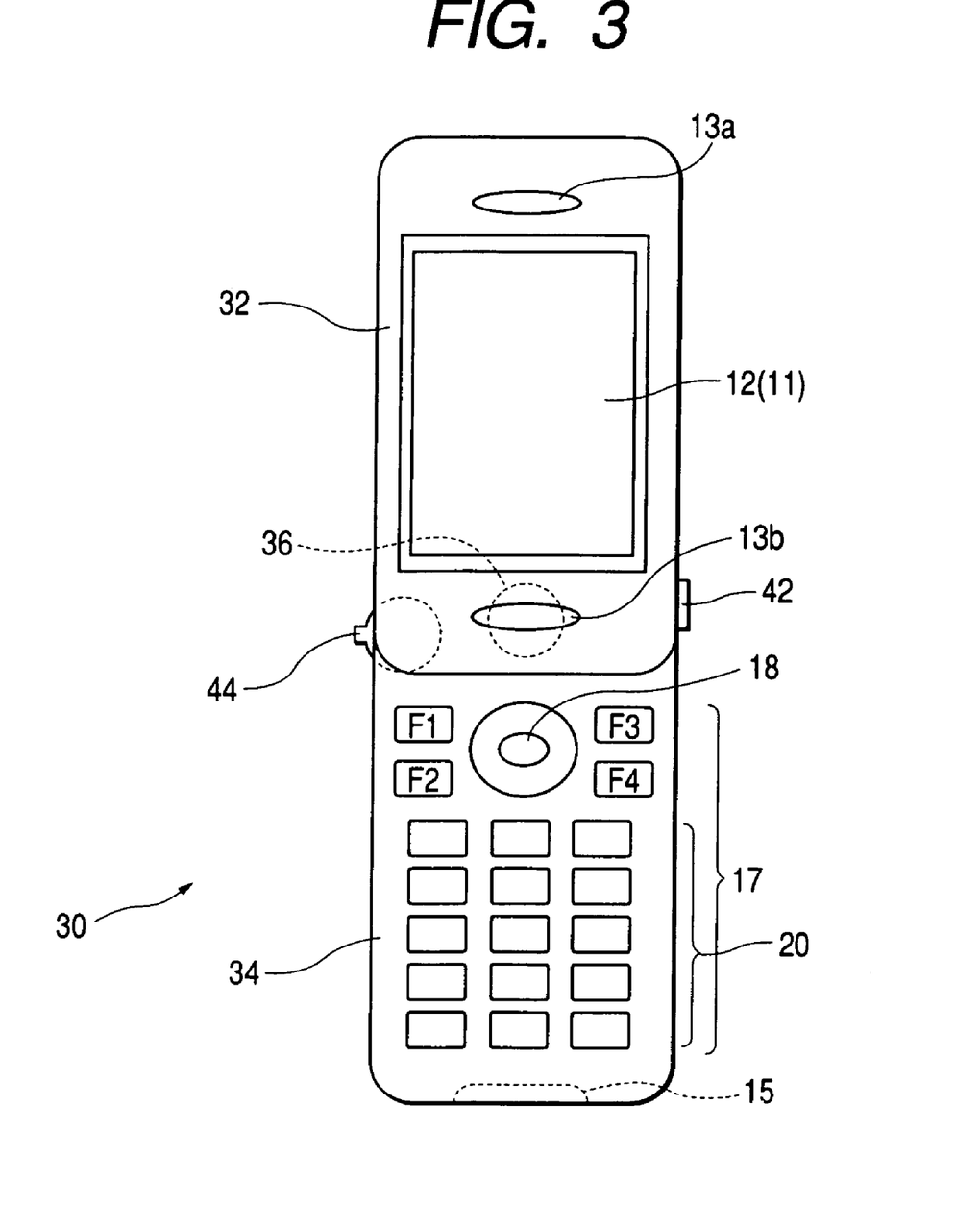
FIG. 3 is a front view showing the overlapping type portable radiotelephone 30 in an opened state.
Figure 4:
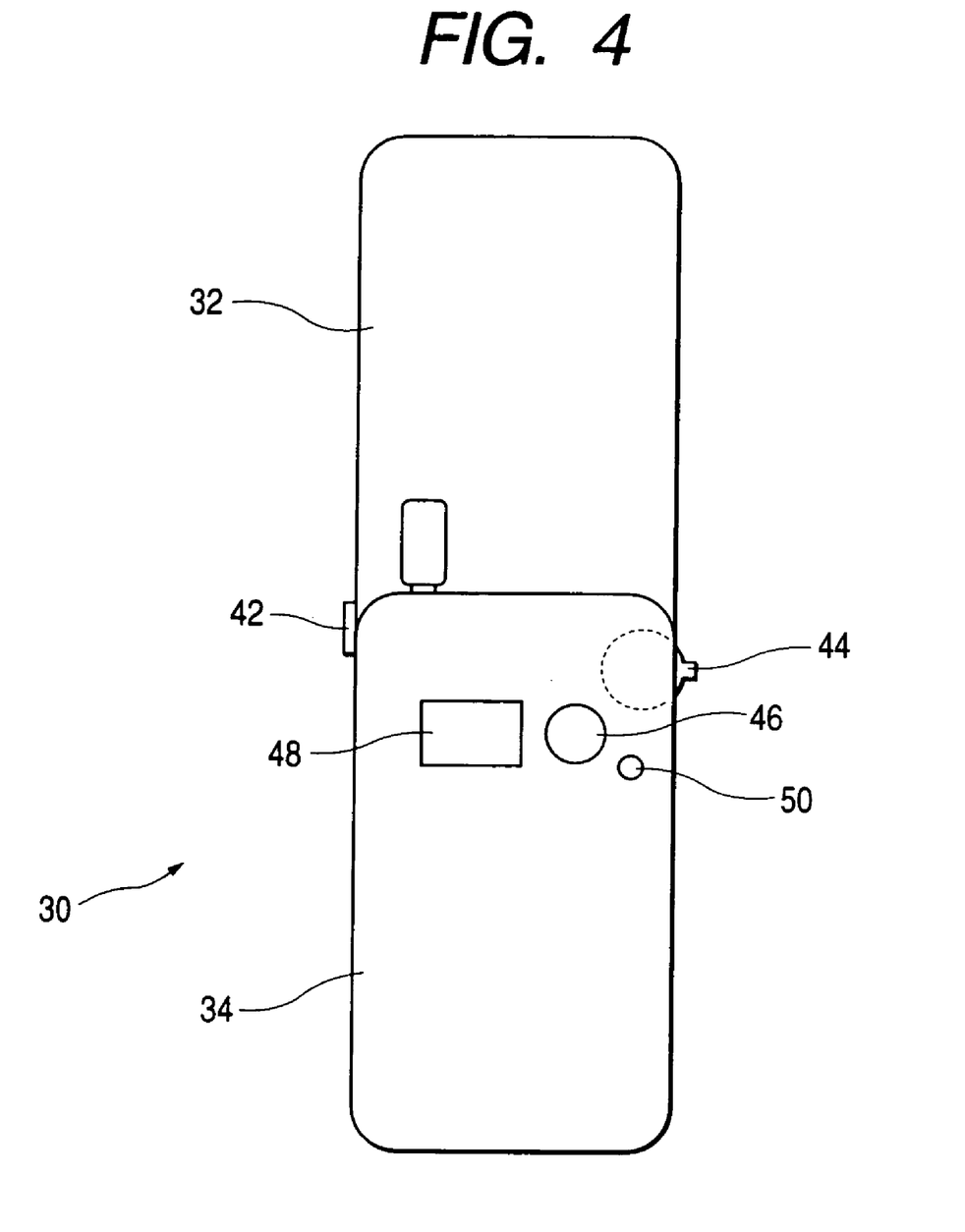
FIG. 4 is a back view of the overlapping type portable radiotelephone 30 in the state as shown in FIG. 3.

By rotating the first housing 32 by 180 degree around the shaft 36 in the direction shown by an arrow mark "a", from the state that the first housing 32 and the second housing 34 are overlapped, the overlapping type portable radiotelephone 30 can be brought into an opened state that the main operation section 17 can be seen from outside as shown in FIGS. 3 and 4.

On this occasion, because the display screen 12 and the speakers 13a, 13b rotate with a state that these are directed in the substantially same direction as the main operation section 17. Therefore, it is possible to see the display screen 12 from outside even in the opened state, and it is also possible to hear the sound uttered from the speakers 13a or 13b.

Although the overlapping type portable radiotelephone 30 of the embodiment is so designed that the first housing 32 rotates around the shaft 36, it might be designed in such a manner, as another embodiment, that by providing rails or the like, the first housing 32 slides with respect to the second housing 34 in a direction as shown by an arrow mark "b" from the state as shown in FIG. 1.

Alternatively, the overlapping type portable radiotelephone might be designed in such a manner that the first housing 32 and the second housing 34 are coupled, and can perform both folding motion and twisting motion at this connected part, as disclosed in the above JP-A-2002-141984.

Therefore, even though the overlapping type portable radiotelephone is constructed in the above described manner, it can be brought into the state as shown in FIGS. 1 and 2 and the state as shown in FIGS. 3 and 4, as well as the overlapping type portable radiotelephone 30 of the embodiment. For this reason, the state as shown in FIGS. 1 and 2 is referred to as "an overlapped state" or "a closed state", while the state as shown in FIGS. 3 and 4 is referred to as "an opened state" in this invention. And it is referred to as "an opening motion" to bring the overlapping type portable radiotelephone from "the closed state" into "the opened state".

As shown in FIG. 4, the overlapping type portable radiotelephone 30 further includes a camera 46, a mirror 48 and a microphone 50 for picture recording on its back face. These members can be operated both in the opened state and in the closed state.

Then, the main operation section 17, the side key 42, the three way lever key 44, and so on will be explained. As shown in FIG. 3, the cursor key 18 and the ten keys 20, which are included in the main operation section 17, provided on an inner face of the second housing 34 of the overlapping type portable radiotelephone 30 can be operated in the opened state. In order to prevent miss operation in this state, the side key 42 and the three way lever key 44 should be inoperative.

Figure 5:
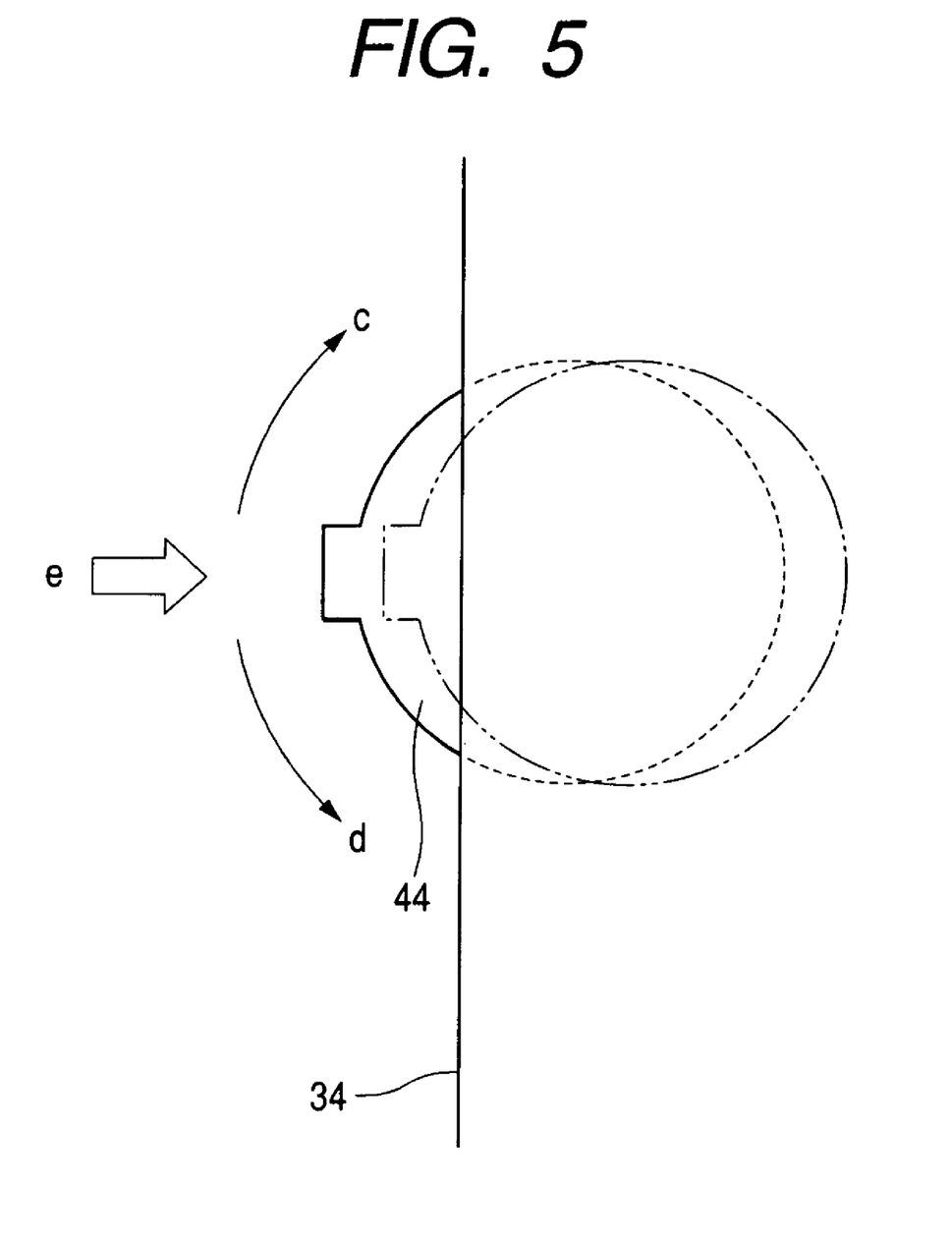
FIG. 5 is an enlarged view of a section showing a three way lever key 44 in FIG. 1.

As shown in FIG. 5, the three way lever key 44 which is used in the closed state can be tilted upward of the drawing (in the direction of an arrow mark "c") and can be tilted downward (in the direction of an arrow mark "d"), and further can be pushed toward the center (in the direction of an arrow mark "e").

Then, by utilizing telephone directory function of the overlapping type portable radiotelephone 30, while a list of names and telephone numbers is displayed on the display screen 12 in the closed state, a user can select someone with whom the user wishes to talk from the list by tilting the three way lever key 44 upward or downward of FIG. 5. In a state that someone is selected, when the three way lever key 44 is pushed toward the center of the drawing, the user can start a call to the selected person. On the other hand, when the user receives an incoming call in the closed state, he can put the mobile phone in a state available for conversation by pushing the three way lever key 44 toward the center of the drawing.

The side key 42 as shown in FIGS. 1 to 4 is so designed that push-in action only can be conducted. While the conversation is in progress in the closed state, the user can push the side key 42 to disconnect the communication when he wishes to finish the conversation.

Figure 6:
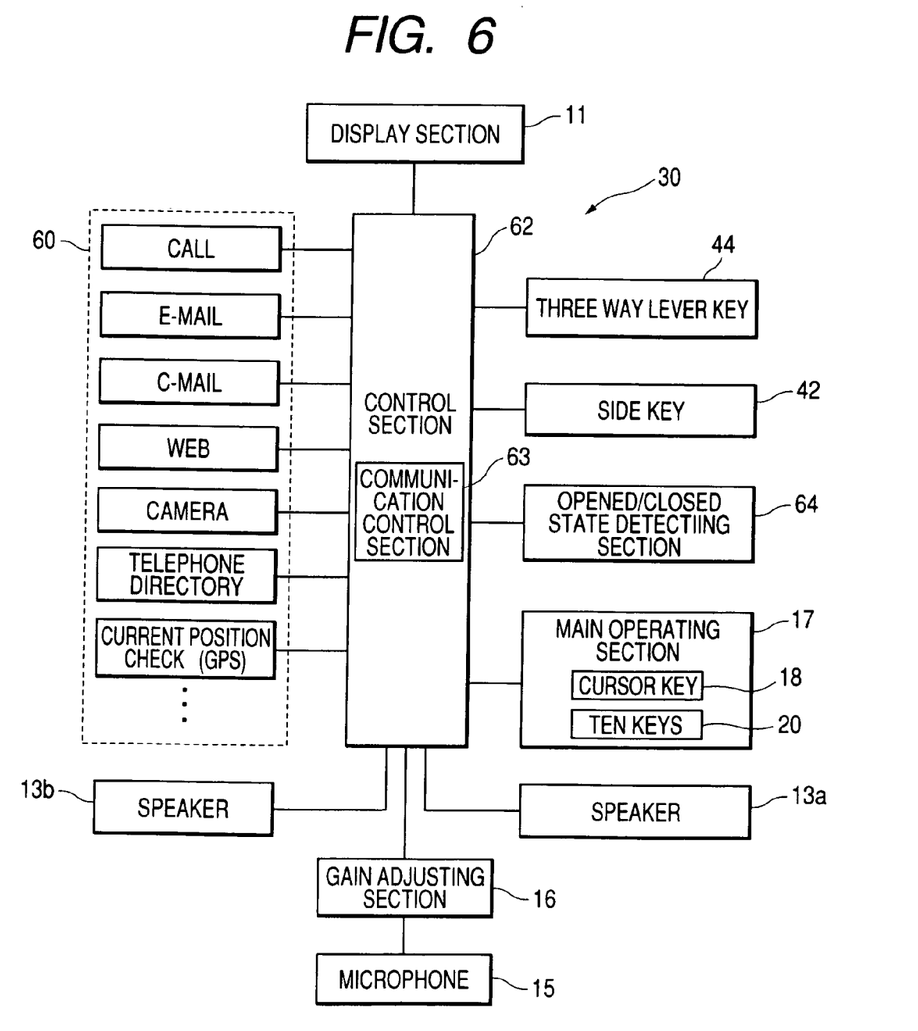
FIG. 6 is a circuit diagram of the overlapping type portable radiotelephone 30 in FIG. 1.

FIG. 6 shows a circuit diagram of the overlapping type portable radiotelephone 30. A section, including various functions represented by reference numeral 60, and the display section 11 are controlled by a control section 62 to perform the functions. In the case where the main operation section 17, the three way lever key 44 and the side key 42 are operated, signals corresponding to the operations are outputted to the control section 62.

Moreover, the speakers 13a and 13b and the microphone 15 which function during the conversation are controlled particularly by a communication control section 63 in the control section 62. The speakers 13a, 13b are separately controlled by the communication control section 63, so that they can perform respectively independent functions. The microphone 15 is controlled by the communication control section 63 by way of a gain adjusting section 16 so that sensitivity of the microphone can be adjusted.

An opened/closed state detecting section 64 in this circuit diagram, although not shown in FIGS. 1 to 4, will detect whether the first housing 32 and the second housing 34 are in the closed state or in the opened state, and will output corresponding signals to the control section 62.

The opened/closed state detecting section 64 might be constituted to have a conductor, which is formed around the shaft 36, to be conducted by the rotation of the first housing 32, and contacts which contact/non-contact with the conductor. Otherwise, mechanical switches or sensors might be used.

Now, movement of the overlapping type portable radiotelephone 30 will be described.

When the overlapping type portable radiotelephone 30 is brought into the closed state, the opened/closed state detecting section 64 detects this state and outputs a signal showing the closed state to the control section 62. In order to start a call in this state, after the list of the names and the telephone numbers has been displayed on the display screen 12 by utilizing the telephone directory function, the three way lever key 44 is tilted upward or downward in FIG. 5 to select a person with whom the user wishes to talk, and then, the three way lever key 44 is pushed toward the center in the drawing to start a call. On the other hand, when an incoming call is received, the three way lever key 44 is pushed toward the center to connect a communication line, and thus, the overlapping type portable radiotelephone 30 can be brought into condition for conversation.

When the overlapping type portable radiotelephone 30 is brought into condition for conversation by starting a call or receiving an incoming call in the closed state, the communication control section 63 in the control section 62 controls the speaker 13a not to function, but controls the speaker 13b to function as a receiver, and controls the microphone 15 to function as a transmitter. Moreover, when the speaker 13b comes near the user's ear, the microphone 15 is not close to the user's mouth. Therefore, the communication control section 63 controls the gain adjusting section 16 to increase the gain thereby to enhance sensitivity of the microphone 15.

Further, in the case where the user feels a sense of incongruity because the microphone 15 is not close to his mouth during the conversation in the closed state, and he has made the opening operation, the opened/closed state detecting section 64 detects the opened state and outputs a signal showing the opened state to the control section 62. On this occasion, the communication control section 63 in the control section 62 controls the speaker 13a to function as the receiver, and at the same time, controls the microphone 15 to function as the transmitter, but controls the speaker 13b not to function. Moreover, in order to restore the sensitivity of the microphone 15 to normal level, the communication control section 63 controls the gain adjusting section 16 to decrease the gain.

Then, in the case where the user wishes to finish the conversation in the opened state, he will make a closing operation to return the overlapping type portable radiotelephone 30 to the closed state. The opened/closed state detecting section 64 detects the closed state and outputs a signal showing the closed state to the control section 62, and the communication control section 63 in the control section 62 will automatically disconnect the communication.

It is taken for granted that the overlapping type portable radiotelephone 30 according to the embodiment can start a call, receive an incoming call, and disconnect communication by operating the main operation section 17 in the opened state, in the same manner as the conventional overlapping type portable radiotelephone 30. In addition, in the case where telephone conversation starts in the closed state after starting a call or receiving an incoming call in the closed state, the communication can be disconnected by pushing the side key 42.

In the overlapping type portable radiotelephone 30 of the embodiment, the auxiliary operation section is provided on the respective side faces 38 and 40 of the first housing 32 and the second housing 34. Alternatively, the auxiliary operation section might be provided on other surface than the surfaces where the first housing 32 and the second housing 34 are opposed to each other in the closed state, for example, on the face of the first housing 32 where the display section 11 is provided, or an end face of the second housing 34 adjacent to the face where the main operation section 17 is provided.

However, considering operability of the portable radiotelephone by one hand in the closed state, it would be preferable to provide the auxiliary operation section on the side face of the first housing 32 adjacent to the face provided with the display section 11, and/or the side face of the second housing 34 adjacent to the face provided with the main operation section 17.

The embodiments of the overlapping type portable radiotelephone according to the invention have been described. It is taken for granted that the invention can be also applied to the case where the overlapping type portable radiotelephone includes three or more housings, on the basis of the similar technical concept.

What is claimed is:

1. A portable radiotelephone comprising:
    a first housing having at least a display section and a speaker section having a first mode of operation and a second mode of operation wherein said speaker section further comprises a first speaker provided at one end of a front face of and in a longitudinal direction of said first housing and a second speaker provided at the other end of the front face of and in a longitudinal direction of said first housing;
    a second housing having at least a main operation section and a microphone;
    at least one auxiliary operation section comprising a switch moveable in at least three directions, each movement of said switch used to operate the portable radiotelephone;
    wherein both of said housings are openably and closably coupled together so that said main operation section is covered with said first housing in a closed state and is exposed outside in an opened state, and said display section and said first speaker and said second speaker are exposed outside in both of the closed state and the opened state, and
    wherein the microphone is provided at one end of the second housing closer to said second speaker than said first speaker in the closed state and wherein a gain of said microphone is automatically adjusted in the closed state and the opened state; and
    a communication control section for enabling a communication and operating said speaker section in said first mode of operation in the closed state, and switching said speaker section from said first mode of operation to said second mode of operation when said housings are brought into the opened state from the closed state while the communication is in progress, wherein in said first mode of operation, said communication control section controls said first speaker to function as a receiver and disables said second speaker, and in said second mode of operation, said communication control section controls one of said first and second speakers that is arranged in a position further from said microphone in the opened state to function as a receiver and disables another one of said first and second speakers that is arranged in a position closer to said microphone in the opened state; and wherein said auxiliary operation section is used to operate the portable radiotelephone in the closed state.

2. The portable radiotelephone according to claim 1, wherein:
    said at least one auxiliary operation section is provided on other surface of said first and second housings than surfaces where said first and second housings are opposed each other in the closed state, and wherein said communication control section controls to connect a communication line when an incoming call is received and then said auxiliary operation section is operated in the closed state.

3. The portable radiotelephone according to claim 2, wherein said first speaker and said second speaker are arranged on a surface provided with said display section of said first housing interposing said display section, and said first housing and said second housing are coupled each other to be rotated around a shaft which is provided in a direction of passing through the first and second housings.

4. The portable radiotelephone according to claim 1, wherein said communication control section controls said portable radiotelephone to disconnect the communication once the portable radiotelephone is brought into the closed state again while the communication is in progress in the opened state.

5. The portable radiotelephone according to claim 1, further comprising:

an opened/closed state detecting section for detecting the opened/closed state of said first housing and said second housing.

6. The portable radiotelephone according to claim 3, wherein said first and second speakers sound an incoming call sound when an incoming call is received.

7. The portable radiotelephone according to claim 6, wherein each of said first and second speakers independently sounds when an incoming call is received, to make stereo effects.

8. The portable radiotelephone according to claim 1, wherein said first housing and said second housing are coupled each other so as to be opened and closed by sliding motion.

9. A portable radiotelephone comprising:

a second housing having a main operation section;

a first housing to be overlapped on said second housing so as to cover said main operation section;

a coupling section which couples respective one ends of said first and second housings in such a manner that said first and second housings are relatively rotated around a shaft extending in a direction of overlapping, wherein said portable radiotelephone is designed so as to be shifted between a closed state in which said first and second housings are overlapped and an opened state in which said first or second housing is rotated by 180 degree from this closed state;

at least one auxiliary operation section comprising a switch moveable in at least three directions, each movement of said switch used to operate the portable radiotelephone and;

a microphone provided on the other end of said second housing wherein a gain of said microphone is automatically adjusted in the closed state and the opened state;

a first speaker provided at the one end of and in a longitudinal direction of said first housing which is directed in same direction with a front face thereof provided with said main operation section;

a second speaker-provided at the other end of and in a longitudinal direction of said first housing which is directed in the same direction with the front face thereof provided with said main operation section, wherein said first speaker and said second speaker are exposed outside in both of said opened state and said closed state; and a communication control section for controlling communication to perform in either said closed state and said opened state, controlling operation of said first and second speaker based on whether said radiotelephone is in the opened state or in the closed state and continuing communication even after the portable radiotelephone is brought into the opened state from the closed state while the communication is in progress, wherein in the closed state, said communication control section controls said first speaker to function as a receiver and disables said second speaker, and in the opened state, said communication control section controls said second speaker to function as a receiver and disable said first speaker; and wherein said auxiliary operation section is used to operate the portable radiotelephone in the closed state.

10. The portable radiotelephone according to claim 9, wherein the communication is performed by means of said first speaker and said microphone in the closed state, and the communication is performed by means of said second speaker and said microphone in the opened state.

11. The portable radiotelephone according to claim 9, wherein said first and second speakers sound an incoming call sound when an incoming call is received.

12. The portable radiotelephone according to claim 11, wherein each of said first and second speakers independently sounds when an incoming call received, to make stereo effects.

13. The portable radiotelephone according to claim 9, further comprising:

a communication control section for controlling functions of said first and second speakers and said microphone; and wherein said at least one auxiliary operation section is provided on other face of said first and second housings than surfaces where said first and second housings are opposed each other in the closed state wherein said communication control section controls to connect a communication line when an incoming call is received and then said auxiliary operation section is operated in the closed state.

14. The portable radiotelephone according to claim 9, wherein said communication control section controls said portable radiotelephone to disconnect the communication once the portable radiotelephone is brought into the closed state again while the communication is in progress in the opened state.

15. The portable radiotelephone according to claim 9, further comprising:

a gain adjusting section for adjusting sensitivity of said microphone, wherein said communication control section controls said gain adjusting section to increase gain of said microphone during the communication in the closed state to be higher than gain of said microphone during the communication in the opened state.

16. The portable radiotelephone according to claim 1 wherein a communication to another party is initiated and a communication from a third party is answered in the closed state.

17. The portable radiotelephone according to claim 9 wherein a communication to another party is initiated and a communication from a third party is answered in the closed state.

18. A portable radiotelephone comprising:

a first housing having at least a display section and a speaker section having a first mode of operation and second mode of operation wherein said speaker section further comprises a first speaker provided at one end of a front face of and in a longitudinal direction of said first housing and a second speaker provided at the other end of the front face of and in a longitudinal direction of said first housing;

a second housing having at least a main operation section and a microphone, wherein both of said housings are openably and closably coupled together by a straight slide movement so that said main operation section is covered with said first housing in a closed state and is exposed outside in an opened state, and said display section and said speaker section are exposed outside in both of the closed state and opened state, and wherein the microphone is provided at one end of the second housing closer to the second speaker than the first speaker in the closed state and wherein a gain of said microphone is automatically adjusted in the closed state and the opened state;

at least one auxiliary operation section comprising a switch moveable in at least three directions, each movement of said switch used to operate the portable radiotelephone;

a communication control section for enabling a communication and operating said speaker in said first mode of operation in the closed state, and switching said speaker section from said first mode of operation to said second mode of operation when said housings are brought into the opened state from the closed state while the communication is in progress, wherein in said first mode of operation, said communication control section controls said first speaker to function as a receiver and disables said second speaker, and in said second mode of operation, said communication control section controls said second speaker to function as a receiver and disables said first speaker; and wherein said auxiliary operation section is used to operate the portable radiotelephone in the closed state.

\* \* \* \* \*